United States Patent
Sundaralingam et al.

(10) Patent No.: US 7,710,933 B1
(45) Date of Patent: May 4, 2010

(54) METHOD AND SYSTEM FOR CLASSIFICATION OF WIRELESS DEVICES IN LOCAL AREA COMPUTER NETWORKS

(75) Inventors: Sri Ganeshan Sundaralingam, Mountain View, CA (US); Aniruddha Patwardhan, Pune (IN)

(73) Assignee: AirTight Networks, Inc., Mountain View, CA (US)

( * ) Notice: Subject to any disclaimer, the term of this patent is extended or adjusted under 35 U.S.C. 154(b) by 1058 days.

(21) Appl. No.: 11/373,068

(22) Filed: Mar. 10, 2006

Related U.S. Application Data

(60) Provisional application No. 60/748,802, filed on Dec. 8, 2005.

(51) Int. Cl.
*H04W 4/00* (2006.01)

(52) U.S. Cl. .................. 370/338; 370/328; 370/351; 713/182; 713/168; 455/411

(58) Field of Classification Search ............. 370/338, 370/328, 351; 713/182, 163; 455/411
See application file for complete search history.

(56) References Cited

U.S. PATENT DOCUMENTS

| | | | |
|---|---|---|---|
| 5,987,611 A | 11/1999 | Freund | |
| 6,618,355 B1 | 9/2003 | Gulliford et al. | |
| 6,647,418 B1 | 11/2003 | Maria et al. | |
| 6,701,432 B1 | 3/2004 | Deng et al. | |
| 6,728,670 B2 | 4/2004 | Schenkel et al. | |
| 6,735,702 B1 | 5/2004 | Vavatkar et al. | |
| 6,745,333 B1 | 6/2004 | Thomsen | |
| 6,753,702 B2 | 6/2004 | Mizuno et al. | |
| 6,754,488 B1 | 6/2004 | Won et al. | |

(Continued)

FOREIGN PATENT DOCUMENTS

GB 2389483 A 12/2003

(Continued)

OTHER PUBLICATIONS

Bellardo et al., Denial-of-Service Attacks: Real vulnerabilities and Practical Solutions, Department of Computer and Science Engineering, University of California at San Diego, Proceedings of the USENIX Security Symposium, Washington DC, Aug. 2003.

(Continued)

*Primary Examiner*—Charles N Appiah
*Assistant Examiner*—Kwasi Karikari
(74) *Attorney, Agent, or Firm*—AirTight Networks; Hemant M. Chaskar

(57) ABSTRACT

A method for classifying radio interfaces in a wireless network. The method includes transferring an unknown MAC address associated with a radio interface of a communication device through a wireless medium and detecting the unknown MAC address on the wireless medium using a first sniffer device. The method also includes transferring information through an access point coupled to a wired medium utilizing the radio interface of the wireless communication device. The information includes the unknown MAC address. The method further includes detecting the unknown MAC address on the wired medium using a second sniffer device and classifying the radio interface as an authorized radio interface based upon detecting the unknown MAC address on the wireless medium and detecting the unknown MAC address on the wired medium.

22 Claims, 8 Drawing Sheets

U.S. PATENT DOCUMENTS

| | | | |
|---|---|---|---|
| 6,897,776 B1 | 5/2005 | Haycraft | |
| 6,957,067 B1 | 10/2005 | Iyer et al. | |
| 7,002,943 B2 | 2/2006 | Bhagwat et al. | |
| 7,035,633 B2* | 4/2006 | Kirkpatrick | 455/426.1 |
| 7,042,852 B2 | 5/2006 | Hrastar | |
| 7,058,796 B2 | 6/2006 | Lynn et al. | |
| 7,127,524 B1 | 10/2006 | Renda et al. | |
| 7,154,874 B2 | 12/2006 | Bhagwat et al. | |
| 7,154,888 B1 | 12/2006 | Li et al. | |
| 7,216,365 B2 | 5/2007 | Bhagwat et al. | |
| 7,236,470 B1* | 6/2007 | Bims | 370/328 |
| 7,257,107 B2 | 8/2007 | Swier et al. | |
| 7,277,404 B2 | 10/2007 | Tanzella et al. | |
| 7,316,031 B2 | 1/2008 | Griffith et al. | |
| 7,339,914 B2 | 3/2008 | Bhagwat et al. | |
| 7,340,768 B2 | 3/2008 | Rosenberger | |
| 7,346,065 B2 | 3/2008 | Kobayashi | |
| 7,383,577 B2 | 6/2008 | Hrastar et al. | |
| 7,440,434 B2 | 10/2008 | Chaskar et al. | |
| 7,478,420 B2* | 1/2009 | Wright et al. | 726/1 |
| 2001/0052014 A1 | 12/2001 | Sheymov et al. | |
| 2002/0143935 A1 | 10/2002 | Schenkel et al. | |
| 2002/0167965 A1* | 11/2002 | Beasley et al. | 370/465 |
| 2003/0051032 A1 | 3/2003 | Schenkel et al. | |
| 2003/0051167 A1 | 3/2003 | King et al. | |
| 2003/0051170 A1* | 3/2003 | Spearman | 713/201 |
| 2003/0106067 A1* | 6/2003 | Hoskins et al. | 725/119 |
| 2003/0126468 A1 | 7/2003 | Markham | |
| 2003/0135762 A1 | 7/2003 | Macaulay | |
| 2003/0149891 A1 | 8/2003 | Thompsen | |
| 2003/0161265 A1 | 8/2003 | Cao et al. | |
| 2003/0167405 A1 | 9/2003 | Freund et al. | |
| 2003/0185244 A1 | 10/2003 | Wu et al. | |
| 2003/0186679 A1 | 10/2003 | Challener et al. | |
| 2003/0188012 A1 | 10/2003 | Ford | |
| 2003/0195002 A1* | 10/2003 | Singhal et al. | 455/436 |
| 2003/0217283 A1 | 11/2003 | Hrastar et al. | |
| 2003/0217289 A1* | 11/2003 | Ammon et al. | 713/201 |
| 2003/0219008 A1 | 11/2003 | Hrastar | |
| 2003/0221006 A1 | 11/2003 | Kuan et al. | |
| 2003/0229703 A1 | 12/2003 | Falola et al. | |
| 2003/0232598 A1 | 12/2003 | Aljadeff et al. | |
| 2003/0233567 A1 | 12/2003 | Lynn et al. | |
| 2003/0236990 A1 | 12/2003 | Hrastar et al. | |
| 2004/0003285 A1 | 1/2004 | Whelan et al. | |
| 2004/0008652 A1 | 1/2004 | Tanzella et al. | |
| 2004/0023640 A1 | 2/2004 | Ballai | |
| 2004/0028017 A1 | 2/2004 | Whitehill | |
| 2004/0047356 A1 | 3/2004 | Bauer | |
| 2004/0049699 A1 | 3/2004 | Griffith et al. | |
| 2004/0078151 A1 | 4/2004 | Aljadeff et al. | |
| 2004/0078717 A1 | 4/2004 | Allred et al. | |
| 2004/0098485 A1 | 5/2004 | Larson et al. | |
| 2004/0098610 A1 | 5/2004 | Hrastar | |
| 2004/0103282 A1 | 5/2004 | Meier et al. | |
| 2004/0107219 A1 | 6/2004 | Rosenberger | |
| 2004/0111640 A1 | 6/2004 | Baum | |
| 2004/0143751 A1 | 7/2004 | Peikari | |
| 2004/0157624 A1* | 8/2004 | Hrastar | 455/456.1 |
| 2004/0203764 A1 | 10/2004 | Hrastar et al. | |
| 2004/0209617 A1 | 10/2004 | Hrastar | |
| 2004/0209634 A1 | 10/2004 | Hrastar | |
| 2004/0210654 A1 | 10/2004 | Hrastar | |
| 2004/0215972 A1 | 10/2004 | Sung et al. | |
| 2004/0218602 A1 | 11/2004 | Hrastar | |
| 2005/0025182 A1 | 2/2005 | Nazari | |
| 2005/0030929 A1 | 2/2005 | Swier et al. | |
| 2005/0039047 A1 | 2/2005 | Raikar | |
| 2005/0042999 A1 | 2/2005 | Rappaport | |
| 2005/0050365 A1 | 3/2005 | Seki et al. | |
| 2005/0055578 A1* | 3/2005 | Wright et al. | 713/201 |
| 2005/0094568 A1 | 5/2005 | Judd | |
| 2005/0094630 A1 | 5/2005 | Valdevit | |
| 2005/0111460 A1 | 5/2005 | Sahita | |
| 2005/0114700 A1 | 5/2005 | Barrie et al. | |
| 2005/0174961 A1 | 8/2005 | Hrastar | |
| 2005/0226195 A1 | 10/2005 | Paris et al. | |
| 2005/0259611 A1 | 11/2005 | Bhagwat et al. | |
| 2006/0123133 A1 | 6/2006 | Hrastar | |
| 2006/0193300 A1 | 8/2006 | Rawat et al. | |
| 2006/0209700 A1 | 9/2006 | Sundar et al. | |
| 2006/0235735 A1 | 10/2006 | Sagfors et al. | |
| 2007/0094741 A1 | 4/2007 | Lynn et al. | |
| 2007/0189290 A1 | 8/2007 | Bauer | |

FOREIGN PATENT DOCUMENTS

| | | | |
|---|---|---|---|
| WO | 0193531 A2 | 6/2001 | |
| WO | 2004019559 A3 | 3/2004 | |
| WO | 2004028121 A2 | 4/2004 | |
| WO | 2004059912 A1 | 7/2004 | |
| WO | 2004095192 A2 | 11/2004 | |

OTHER PUBLICATIONS

Lim et al., Wireless Intrusion Detection and Response, Proceedings of the 2003 IEEE Workshop on Information Assurance United States Military Academy, West Point, NY, Jun. 2003.

Chirumamilla et al., Agent based intrusion detection and response system for wireless LANs, IEEE International Conference on Communications (ICC), May 11-15, 2003, pp. 492-496, vol. 1.

Korba et al., Security system for wireless local area networks, Personal, Indoor and Mobile Radio Communications, Sep. 8-11, 1998, pp. 1550-1554, vol. 3, Boston, USA.

Zhang et al., Intrusion detection techniques for mobile wireless networks, Wireless Networks, Sep. 2003, pp. 545-556, vol. 9, issue 3.

Yang et al., Intrusion detection solution to WLANs, Software Base, Civil Aviation University of China, Tianjin, China, IEEE 6th Circuits and Systems (CAS) Symposium on Emerging Technologies: Mobile and Wireless Communication, Shanghai, China, May 31-Jun. 2, 2004, vol. 2, pp. 553-556.

Hatami et al., In-Building Intruder Detection for WLAN Access, Center for Wireless Information Network Studies, Worcester Polytechnic Institute (WPI), MA, USA, 2004 Position Location and Navigation Symposium, Apr. 26-29, 2004, pp. 592-597.

Yeo et al., A Framework for Wireless LAN Monitoring and Its Applications, Proceedings of the 2004 ACM workshop on Wireless security, Oct. 1, 2004, pp. 70-79.

* cited by examiner

METHOD AND SYSTEM FOR CLASSIFICATION OF WIRELESS DEVICES IN LOCAL AREA COMPUTER NETWORKS

CROSS-REFERENCES TO RELATED APPLICATIONS

This present application claims priority to U.S. Provisional Application No. 60/748,802, filed Dec. 8, 2005, entitled "METHOD AND SYSTEM FOR CLASSIFICATION OF WIRELESS DEVICES IN LOCAL AREA COMPUTER NETWORKS," commonly assigned, and hereby incorporated by reference for all purposes.

BACKGROUND OF THE INVENTION

The present invention relates generally to wireless computer networking techniques. More particularly, the invention provides methods and systems for classifying radio interfaces in a wireless network, for example, classifying an unknown radio interface as authorized. In an embodiment, the classifying enables enforcing a wireless security policy. In another embodiment, the classifying enables detecting and disrupting undesirable wireless communication of devices in local area networks. These methods and systems can be applied to many computer networking environments, e.g., environments based upon the IEEE 802.11 family of standards (WiFi), Ultra Wide Band (UWB), IEEE 802.16 (WiMAX), Bluetooth, and others.

Computer systems have proliferated from academic and specialized science applications to day-to-day business, commerce, information distribution and home applications. Such systems can include personal computers (PCs) to large mainframe and server class computers. Powerful mainframe and server class computers run specialized applications for banks, small and large companies, e-commerce vendors, and governments. Personal computers can be found in many offices, homes, and even local coffee shops.

The computer systems located within a specific local geographic region (e.g. an office, building floor, building, home, or any other defined indoor and/or outdoor geographic region) are typically interconnected using a Local Area Network (LAN) (e.g. the Ethernet). The LANs, in turn, can be interconnected with each other using a Wide Area Network (WAN) (e.g. the Internet). A conventional LAN can be deployed using an Ethernet-based infrastructure comprising cables, hubs switches, and other elements.

Connection ports (e.g. Ethernet ports) can be used to couple multiple computer systems to the LAN. For example, a user can connect to the LAN by physically attaching a computing device (e.g. a laptop, desktop, or handheld computer) to one of the connection ports using physical wires or cables. Other types of computer systems, such as database computers, server computers, routers, and Internet gateways, can be connected to the LAN in a similar manner. Once physically connected to the LAN, a variety of services can be accessed (e.g. file transfer, remote login, email, WWW, database access, and voice over IP).

Using recent (and increasingly popular) wireless technologies, users can now be wirelessly connected to the computer network. Thus, wireless communication can provide wireless access to a LAN in the office, home, public hot-spot, and other geographical locations. As an example, the IEEE 802.11 family of standards (also called Wireless Local Area Network, WLAN or WiFi) is a common standard for such wireless communication. In WiFi, the 802.11b standard provides for wireless connectivity at speeds up to 11 Mbps in the 2.4 GHz radio frequency spectrum The 802.11g standard provides for even faster connectivity at about 54 Mbps in the 2.4 GHz radio frequency spectrum; and the 802.11a standard provides for wireless connectivity at speeds up to 54 Mbps in the 5 GHz radio frequency spectrum. Wireless communication standards that offer even higher data rates and/or operate in different frequency spectrums are also being proposed.

Advantageously, WiFi can facilitate a quick and effective way of providing a wireless extension to an existing LAN. To provide this wireless extension, one or more WiFi access points (APs) can connect to the connection ports either directly or through intermediate equipment, such as WiFi switch. After an AP is connected to a connection port, a user can access the LAN using a device (called a station) equipped with WiFi radio. The station can wirelessly communicate with the AP. Wireless networks have been highly successful.

Wireless networks use radio signals for information transfer. Since wireless signals cannot be confined to physical boundaries of premises, they often cause a variety of security concerns. For example, unauthorized wireless device (e.g. in neighboring premises, parking lot, street) can use ad hoc wireless communication to communicate with authorized wireless device in the LAN and access confidential information on the authorized device. Moreover, the unauthorized device can gain access into the authorized device and exploit the authorized device as a launching pad for attacks on the LAN. Another example of security concern is the possibility of wireless devices in the LAN connecting (e.g. unwittingly or maliciously) to external AN (e.g. APs in the neighboring premises, malicious APs in the neighborhood, honeypot APs etc.). Unauthorized wireless devices can also wirelessly connect to authorized APs in the LAN. Therefore, a need arises for improving the security for wireless LAN environments.

SUMMARY OF THE INVENTION

According to embodiments of the present invention, techniques related to wireless computer networking are provided. More particularly, the invention provides methods and systems for classifying radio interfaces in a wireless network, for example, classifying an unknown radio interface as authorized. In an embodiment, the classifying enables enforcing a wireless security policy. In another embodiment, the classifying enables detecting and disrupting undesirable wireless communication of devices in local area networks. These methods and systems can be applied to many computer networking environments, e.g., environments based upon the IEEE 802.11 family of standards (WiFi), Ultra Wide Band (UWB), IEEE 802.16 (WiMAX), Bluetooth, and others.

According to an embodiment of the present invention, a method for classifying radio interfaces in a wireless network is provided. The method includes transferring an unknown MAC address associated with a radio interface of a communication device through a wireless medium and detecting the unknown MAC address on the wireless medium using a first sniffer device. The method also includes transferring information through an access point coupled to a wired medium utilizing the radio interface of the wireless communication device. The information includes the unknown MAC address. The method further includes detecting the unknown MAC address on the wired medium using a second sniffer device and classifying the radio interface as an authorized radio interface based upon detecting the unknown MAC address on the wireless medium and detecting the unknown MAC address on the wired medium.

According to another embodiment of the present invention, a wireless security system is provided. The wireless security system includes a first sniffer device adapted to detect an unknown MAC address transmitted through a wireless medium using a radio interface of a communication device and a second sniffer device adapted to detect the unknown MAC address transmitted through a wired medium. The wireless security systems also includes a processor adapted to classify the radio interface as an authorized radio interface based upon detection of the unknown MAC address by the first sniffer and the second sniffer.

Many benefits are achieved by way of the present invention over conventional techniques. For example, an embodiment provides an automatic method of classifying radio interfaces. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

According to embodiments of the present invention, techniques related to wireless computer networking are provided. More particularly, the invention provides methods and systems for classifying radio interfaces in a wireless network, for example, classifying an unknown radio interface as authorized. In an embodiment, the classifying enables enforcing a wireless security policy. In another embodiment, the classifying enables detecting and disrupting undesirable wireless communication of devices in local area networks. These methods and systems can be applied to many computer networking environments, e.g., environments based upon the IEEE 802.11 family of standards (WiFi), Ultra Wide Band (UWB), IEEE 802.16 (WiMAX), Bluetooth, and others.

Conventional security of a computer network has focused on controlling access to the physical space where the local area network (LAN) connection ports are located. The application of wireless communication to computer networking has introduced new security risks. Specifically, the radio waves that are integral to wireless communication often cannot be contained within the physical boundaries of the region of operation of a local area network (e.g. an office space or a building). In an embodiment this "spillage" can be used by unauthorized wireless devices (e.g. outside the region of operation of the LAN) to wirelessly connect to the local area network. In another embodiment, wireless signals from outsider devices (e.g. devices in neighbor's wireless network, devices on street, devices in parking lot etc.) can be received within the region of operation of the LAN. This can cause authorized wireless devices in the LAN to wirelessly connect to the outsider devices. As computer networks with wireless extensions become more ubiquitous, users are increasingly concerned about such undesirable wireless communications.

Figure 1:
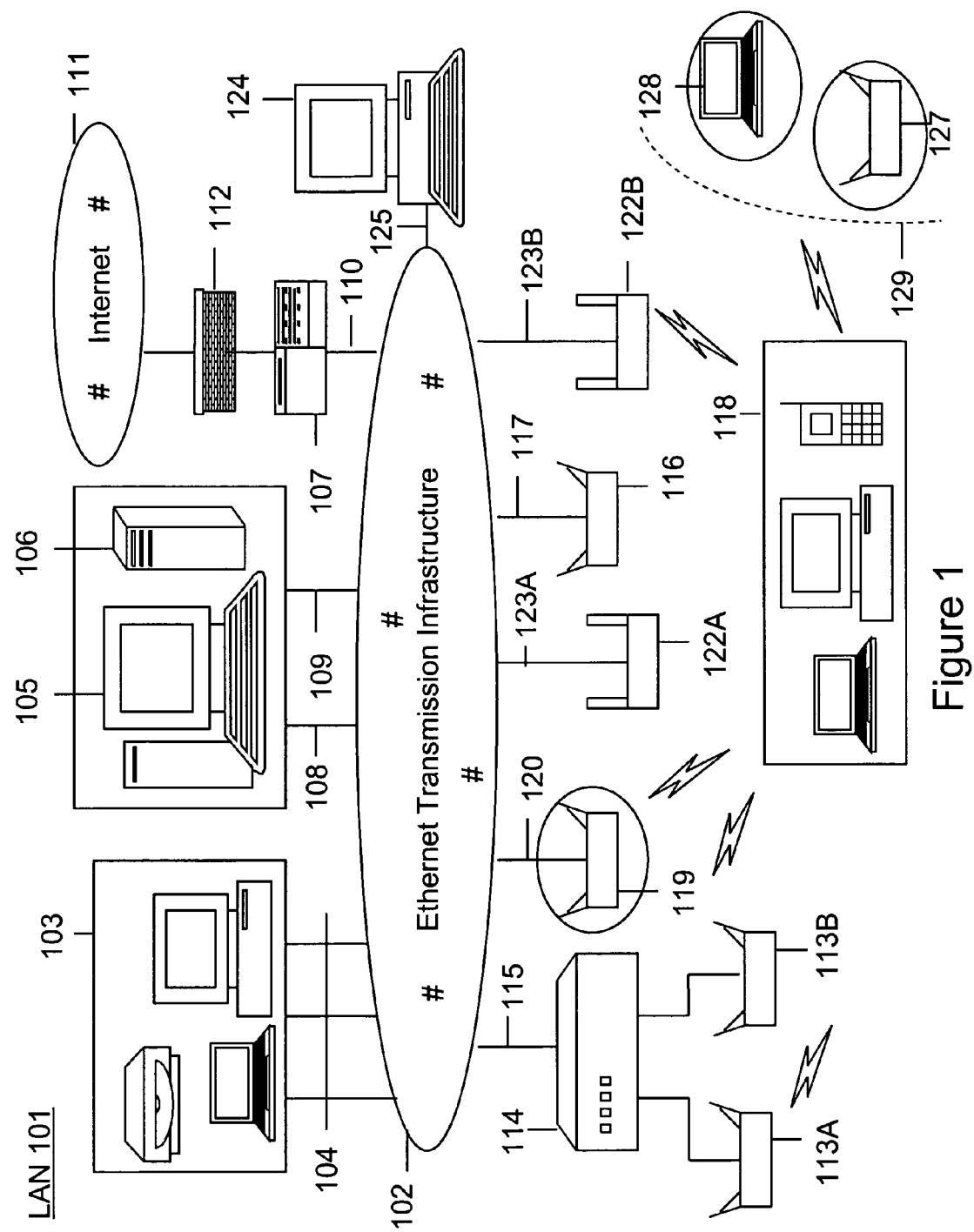
FIG. 1 is a simplified schematic diagram illustrating a local area network according to an embodiment of the present invention.

Accordingly, the present invention provides methods and systems for monitoring wireless communication of devices in the LAN environments. Advantageously, these methods and systems can prevent network and/or information security breaches over undesirable wireless connections. FIG. 1 illustrates a simplified local area network (LAN) 101 that can facilitate security monitoring according to an embodiment of the present invention. This diagram is merely an example, which should not unduly limit the scope of the claims herein. One of ordinary skill in the art would recognize many variations, modifications, and alternatives.

In LAN 101, a core transmission infrastructure 102 can include various transmission components, e.g. Ethernet cables, hubs, and switches. In a typical deployment, the core transmission infrastructure 102 comprises one or more network segments. According to an embodiment, a network segment refers to an IP "subnetwork" (called "subnet"). Each subnet is identified by a network number (e.g. IP number and subnet mask) and plurality of subnets are interconnected using router devices. Notably, the plurality of subnets of the LAN 101 can be geographically distributed (e.g. in offices of a company in different geographic locations). The geographically distributed segments are interconnected via virtual private network (VPN).

One or more connection ports (e.g. Ethernet sockets) are provided on each of the segments for connecting various computer systems to the LAN 101. Thus, one or more end user devices 103 (such as desktop computers, notebook computers, telemetry sensors etc.) can be connected to LAN 101 via one or more connection ports 104 using wires (e.g. Ethernet cables) or other suitable connection means.

Other computer systems that provide specific functionalities and services can also be connected to LAN 101. For example, one or more database computers 105 (e.g. computers storing customer accounts, inventory, employee accounts, financial information, etc.) may be connected to LAN 101 via one or more connection ports 108. Additionally, one or more server computers 106 (computers providing services, such as database access, email storage, HTTP proxy service, DHCP service, SIP service, authentication, network management etc.) may be connected to LAN 101 via one or more connection ports 109.

In this embodiment, a router 107 can be connected to LAN 101 via a connection port 110. Router 107 can act as a gateway between LAN 101 and the Internet 111. Note that a firewall/VPN gateway 112 can be used to connect router 107 to the Internet 111, thereby protecting computer systems in LAN 101 against hacking attacks from the Internet 111 as well as enabling remote secure access to LAN 101.

In this embodiment, a wireless extension of LAN 101 is also provided. For example, authorized APs 113A and 113B can be connected to LAN 101 via a switch 114. Switch 114 in turn can be connected to a connection port 115. Switch 114 can assist APs 113A and 113B in performing certain complex procedures (e.g. procedures for authentication, encryption, QoS, mobility, firewall etc.) as well as provide centralized management functionality for APs 113A and 113B. Note that an authorized AP 116 can also be directly connected to LAN 101 via a connection port 117. In this case, AP 116 may perform necessary security procedures (such as authentication, encryption, firewall, etc.) itself.

In this configuration, one or more end user devices 118 (such as desktop computers, laptop computers, handheld computers, PDAs, etc.) equipped with radio communication capability can wirelessly connect to LAN 101 via authorized APs 113A, 113B, and 116. Notably, authorized APs connected to the LAN 101 provide wireless connection points on the LAN. Note that WiFi or another type of wireless network format (e.g. UWB, WiMax, Bluetooth, etc.) can be used to provide the wireless protocols.

As shown in FIG. 1, an unauthorized wireless device 128 can wirelessly connect with an authorized AP (e.g. AP 113A, 113B, 116 etc.). For example, wireless signal from the authorized AP can spill outside the region of operation of the LAN 101 (e.g. outside the physical boundary 129). This signal can be detected by the unauthorized wireless device. The unauthorized wireless device can then attempt wireless connection to the authorized AP. In an embodiment, the authorized AP can be mis-configured (e.g., open AP), which can facilitate the unauthorized device to connect to it. In another embodiment, this can happen if the unauthorized device performs key cracking (e.g. if the authorized AP uses weak forms of wireless encryption) by sniffing and analyzing wireless transmissions associated with the AP. The cracked keys can then be used by the unauthorized device to connect to the authorized AP. As merely an example the unauthorized wireless device 128 can be a wireless device in neighboring premises, street, parking lot or any other device that is not authorized to access the resources on LAN 101.

In an embodiment, an unauthorized wireless device can connect to unauthorized AP (e.g. Rogue AP) 119 that can be connected to the LAN 101, for example, without the knowledge of the system administrator. In another embodiment an unauthorized wireless device 128 can use ad hoc wireless communication to communicate with one of the authorized devices 118. The device 128 can compromise the integrity of the authorized device and can even gain unauthorized access to the LAN 101 through the authorized device (e.g. if the authorized device is connected to the LAN over wired connection port or wireless connection port).

As shown in FIG. 1, in an embodiment an authorized wireless device 118 can wireless connect to an external AP 127. As merely an example, the external AP can be neighbor's AP, honeypot AP or any other AP that is not a part of LAN 101. This can compromise the security of the as the authorized device can reveal secrets such as passwords to the external AP. The external AP can also include itself as man in the middle of authorized communication.

Notably the security threat from ad hoc wireless communication and from wireless connection between the authorized and the external device exists even when the LAN 101 does not use wireless extensions (e.g. LAN 101 uses no-WiFi policy). Mere presence of devices that are WiFi capable (e.g. laptops, PDAs, mobile phones etc.) can cerate these security vulnerabilities.

In accordance with one aspect of the invention, a security monitoring system can detect, and optionally disrupt the undesirable wireless communications. The security monitoring system can include one or more RF sensor devices (e.g. sensor devices 122A and 122B, each generically referenced herein as a sniffer 122) disposed within and/or in a vicinity of a geographic region comprising LAN 101. In an embodiment (shown in FIG. 1), sniffer 122 can be connected to LAN 101 via a connection port (e.g. connection port 123A/123B). In another embodiment, sniffer 122 can be connected to LAN 101 using a wireless connection.

In an embodiment, a sniffer 122 is able to monitor wireless activity in a subset of the geographic region comprising LAN 101. Wireless activity can include any transmission of control, management, or data packets between an AP and one or more wireless stations, or among one or more wireless stations.

In general, sniffer 122 can listen to a radio channel and capture transmissions on that channel. In an embodiment, sniffer 122 can cycle through multiple radio channels on which wireless communication could take place. On each radio channel, sniffer 122 can wait and listen for any ongoing transmission. In an embodiment, sniffer 122 can operate on multiple radio channels simultaneously.

Whenever a transmission is detected, sniffer 122 can collect and record the relevant information about that transmission. This information can include all or a subset of information gathered from various fields in a captured packet. In another embodiment, a receive signal strength indicator (RSSI) associated with the captured packet can also be recorded. Other information such as the day and the time the transmission was detected can also be recorded. The information collected by one or more sniffers can be used to detect undesirable wireless communication.

A sniffer 122 can transmit packets over the wireless medium. These packet transmissions can facilitate disrupting of the detected undesirable wireless communication according to an aspect of the present invention.

Figure 2:
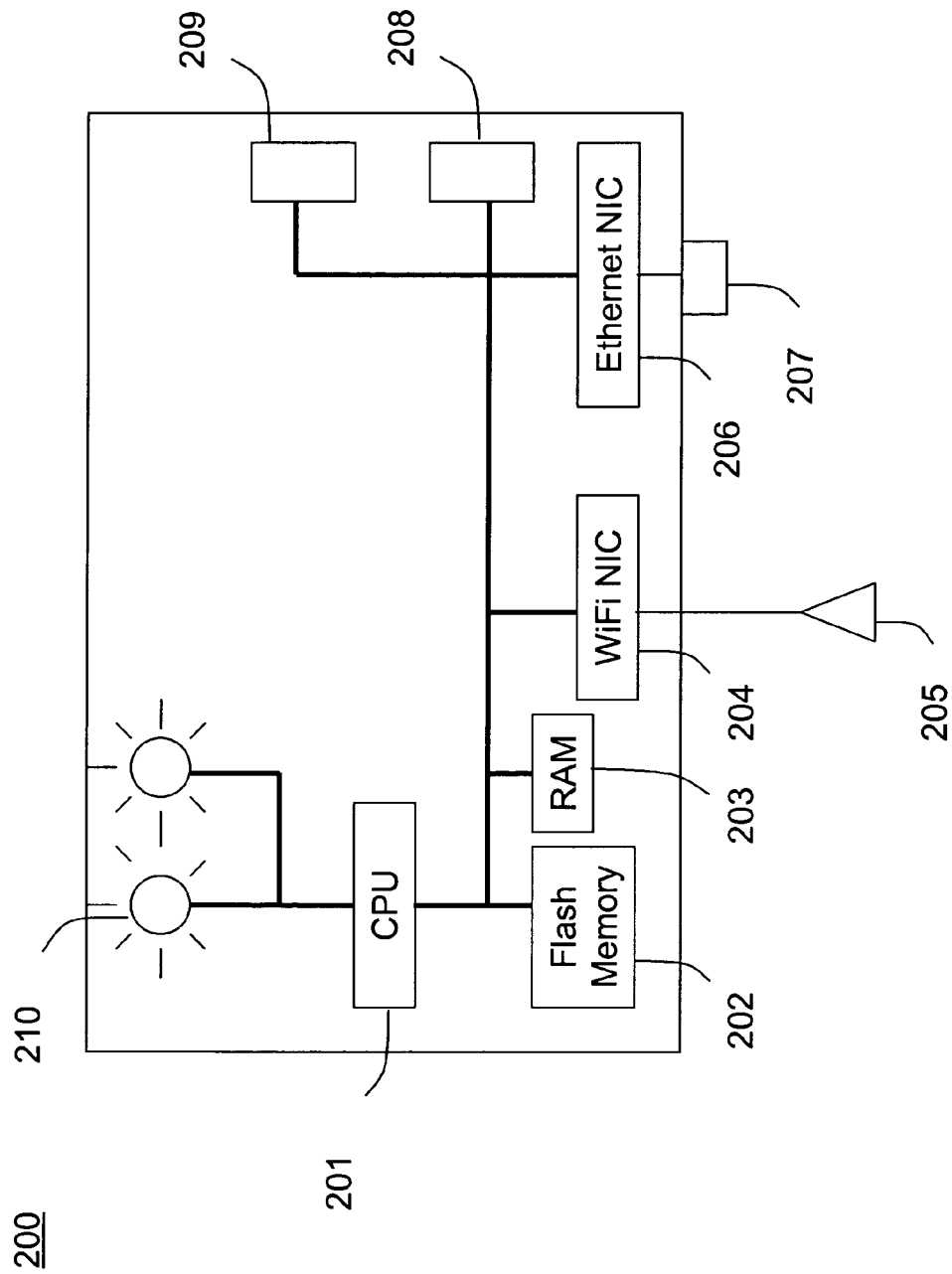
FIG. 2 is a simplified schematic diagram of a sniffer device according to an embodiment of the present invention.

An exemplary hardware diagram of the sniffer is shown in FIG. 2. This diagram is merely an example, which should not unduly limit the scope of the claims herein. One of ordinary skill in the art would recognize many variations, alternatives, and modifications. As shown, sniffer 122 can have a central processing unit (CPU) 201, a flash memory 202 where the software code for sniffer functionality resides, and a RAM 203 which serves as volatile memory during program execution. The sniffer 122 can have one or more 802.11 wireless network interface cards (NICs) 204 which perform radio and wireless MAC layer functionality and one or more of dual-band (i.e., for transmission detection in both the 2.4 GHz and 5 GHz radio frequency spectrums) antennas 205 coupled to the wireless NICs. Each of the wireless NICs 204 can operate in a, b, g, b/g or a/b/g mode. Moreover, the sniffer 122 can have an Ethernet NIC 206 which performs Ethernet physical and MAC layer functions, an Ethernet jack 207 such as RJ-45 socket coupled to the Ethernet NIC for connecting the sniffer device to wired LAN with optional power over Ethernet or POE, and a serial port 208 which can be used to flash/configure/troubleshoot the sniffer device. A power input 209 is also provided. One or more light emitting diodes (LEDs) 210 can be provided on the sniffer device to convey visual indications (such as device working properly, error condition, undesirable wireless activity alert, and so on).

In an embodiment, sniffer 122 can be built using a hardware platform similar to that used to build an AP, although having different functionality and software. In an embodiment, both the sniffer and the AP functionality can be provided in the same hardware platform. In another embodiment, the sniffer functionality is provided as software that is run on one or more computers in the wireless network. In yet another embodiment, the sniffer does not have wireless NICs 204. Such a sniffer can be used to detect traffic on a wired portion of the LAN which can facilitate certain embodiments of the present invention (described more particularly below).

Server 124 (also called "security appliance") can be coupled to LAN 101 using a connection port 125. In an embodiment, each sniffer 122 can convey its information about detected wireless activity to server 124 (i.e., over one or more computer networks). Servers 124 can then analyze that information, store the results of that analysis, and process the results. In another embodiment, sniffer 122 may filter and/or summarize its information before conveying it to server 124. Sniffer 122 may also receive specific instructions from server 124, e.g. tuning to specific radio channel, detecting transmission of specific packets on a radio channel, indication about undesirable wireless activity etc. In an alternative embodiment, the sniffer 122 can operate as a standalone device without having to communicate with the server.

Figure 3:
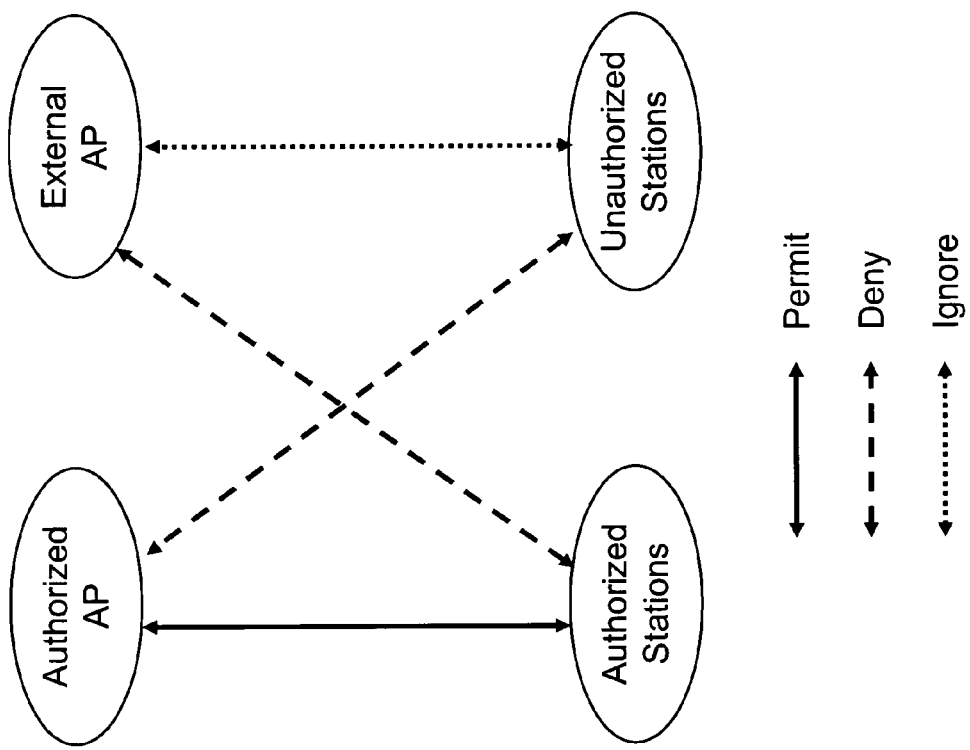
FIG. 3 is simplified diagram illustrating a wireless security policy according to an embodiment of the present invention.

In an embodiment a wireless security policy can be enforced using the security monitoring system comprising one or more sniffers. An exemplary wireless security policy is illustrated in FIG. 3. This diagram is merely an example, which should not unduly limit the scope of the claims herein. One of ordinary skill in the art would recognize many variations, modifications, and alternatives. As shown the wireless security policy can include permitting wireless communication between an authorized wireless station (e.g. stations 118) and an authorized AP (e.g. APs 113A, 113B and 116). In an embodiment the authorized wireless station can be a wireless device (e.g. laptop, PDA etc.) that is authorized to wirelessly communicate with the authorized APs in the LAN 101.

Moreover the wireless security policy can include ignoring (i.e. permitting without causing disturbance) wireless communication between an unauthorized wireless station (e.g. station 128) and an external AP (e.g. AP 127). In an embodiment the unauthorized wireless station can include a wireless device in the neighbor's wireless network and the external AP can include an AP in the neighbor's wireless network. In another embodiment the unauthorized wireless station can include a wireless device of an attacker on the street, parking lot etc. Advantageously, the ignoring eliminates false alarms associated with security policy violation and removes nuisance factor from the operation of the security monitoring system. The ignoring also eliminates the risk of disturbing co-existing neighbors' wireless networks.

The wireless security policy can include denying wireless communication between an unauthorized wireless station and an authorized AP and wireless communication between an authorized wireless station and an external AP. In an embodiment, the denying can include triggering an intrusion alarm (e.g. sending email or SMS to the administrator of the LAN, logging events etc.). In another embodiment, the denying can include generating interference (e.g. using sniffers) with the wireless communication between the unauthorized wireless station and the authorized AP. In an embodiment the denying can include generating interference (e.g. using sniffers) with the wireless communication between the authorized wireless station and the external AP. Preferably the interference prohibits (e.g. creates hindrance) for the wireless communication.

In an embodiment, prohibiting the wireless communication comprises initiating a prevention process. One embodiment of the prevention process works by preventing or breaking the "association" between the AP and the wireless station that are involved in the denied wireless activity. Association is the procedure defined in the 802.11 standard wherein the wireless station and the AP establish a wireless connection between them. Techniques for preventing or breaking the association include but are not limited to transmitting one or more spoofed "deauthentication" or "disassociation" packets from one or more of the sniffers with the AP's MAC address as source address (e.g. with a reason code "Authentication Expired") to the wireless station or to a broadcast address, and sending one or more spoofed deauthentication or disassociation packets from one or more of the sniffers to the AP with the wireless station's MAC address as source address (e.g., with reason code "Auth Leave"). This is called "forced deauthentication" prevention process.

Figure 4:
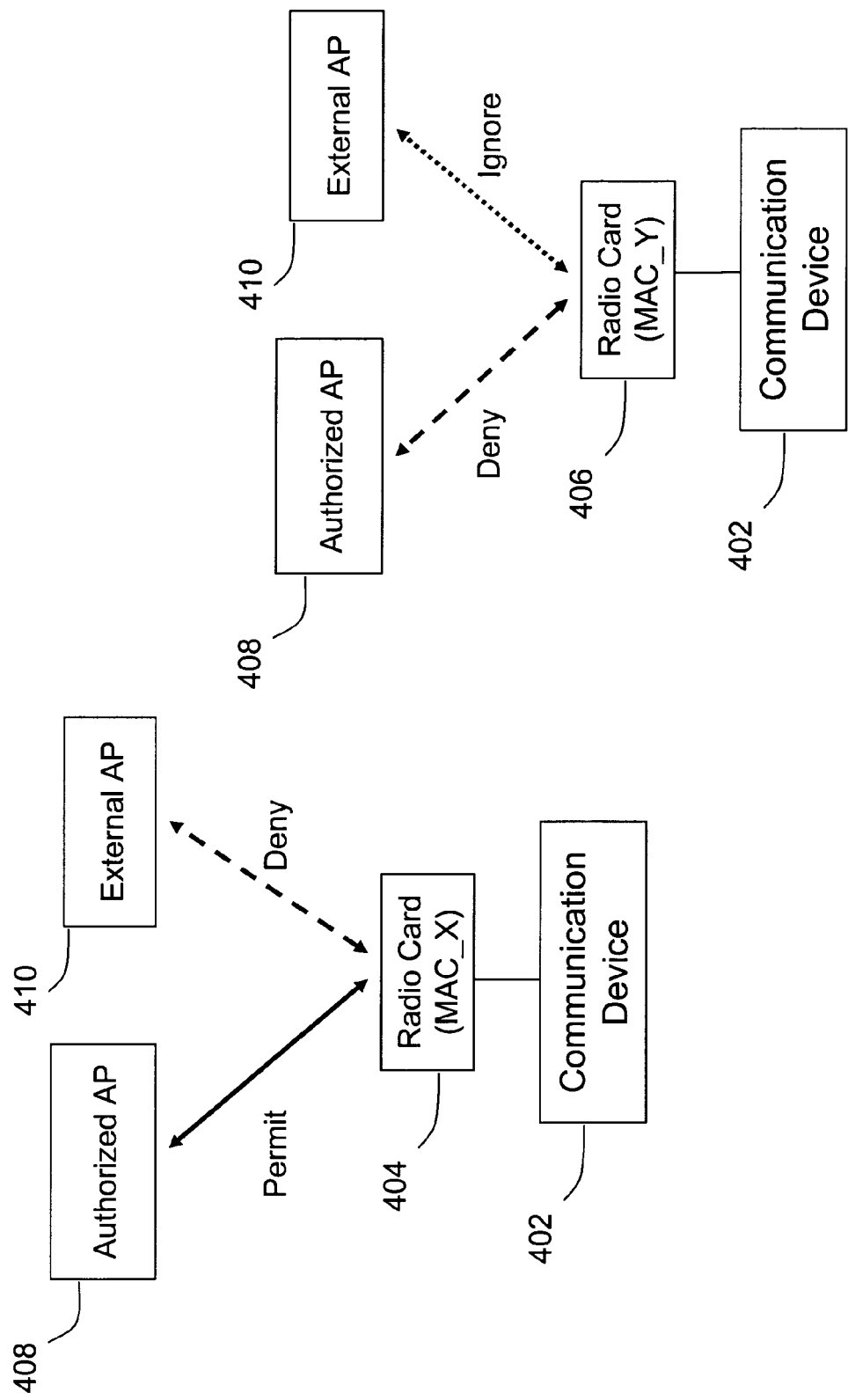
FIG. 4 is a simplified diagram illustrating operation of a wireless security policy.

A practical problem often encountered in relation to the foregoing security policy and other security policies is keeping up-to-date inventory of authorized wireless device identities (e.g. list of MAC addresses of authorized radio interfaces). For example the users of the wireless network can often change radio cards (e.g. wireless network interface cards) on their devices (laptops, PDAs etc.) and not inform the network administrator about it. Even if they do inform the network administrator of radio card changes, keeping an inventory of all the radio cards is a cumbersome task for the system administrator. By way of example, this problem is illustrated in FIG. 4. This diagram is merely an example, which should not unduly limit the scope of the claims herein. One of ordinary skill in the art would recognize many variations, modifications, and alternatives.

As shown, in an embodiment a communication device (402) can be a laptop, a PDA, a mobile phone or any other device. A first WiFi radio card (404) and/or a second radio card (406) can be coupled to the communication device. In an embodiment, the WiFi radio card can be a PCMCIA card, a PCI card, built in card such as Centrino and others. The WiFi radio card is identified using its wireless MAC address (which is also referred to as a "radio MAC address") which is a 48-bit address associated with the wireless hardware in the card. The wireless or radio MAC address is usually configured into the card by the manufacturer of the card. The wireless MAC addresses (of WiFi radio cards, APs etc.) are used as identifiers of the communicating devices in accordance with an IEEE 802.11 wireless LAN standard. The wireless MAC address of a device (e.g. WiFi radio cards, APs etc.) can also be included in the 802.11 type frames transmitted by or destined to the device.

Suppose the MAC address of the first card (404) is MAC_X and that of the second card (406) is MAC_Y. Moreover suppose that the user of the communication device has registered the address MAC_X with the security monitoring system an authorized wireless device identity, while the address MAC_Y is not registered with the security monitoring system as the authorized wireless device identity. For example, this can happen if the user obtains a new WiFi radio card (406) and uses it on the communication device. Thus when the first card (404) is used for wireless communication on the device (402), the security monitoring system will permit wireless communication between the communication device (402) and an authorized AP (408), while when the second card (406) is used for wireless communication on the device (402), the security monitoring system will deny wireless communication between the communication device (402) and the authorized AP (408). The present inventors have appreciated the problems presented by this undesirable behavior since the authorized user cannot access the wireless network using the second card.

In another embodiment, when the first card (404) is used, the security monitoring system will deny wireless communication between the device (402) and an external AP (410), while when the second card (406) is used, the security monitoring system will ignore (e.g. permit without disturbance) wireless communication between the device (402) and the external AP (410). Clearly this behavior is undesirable as the authorized user will be able to connect to the external AP using the second wireless card which can cause security vulnerability.

Figure 5:
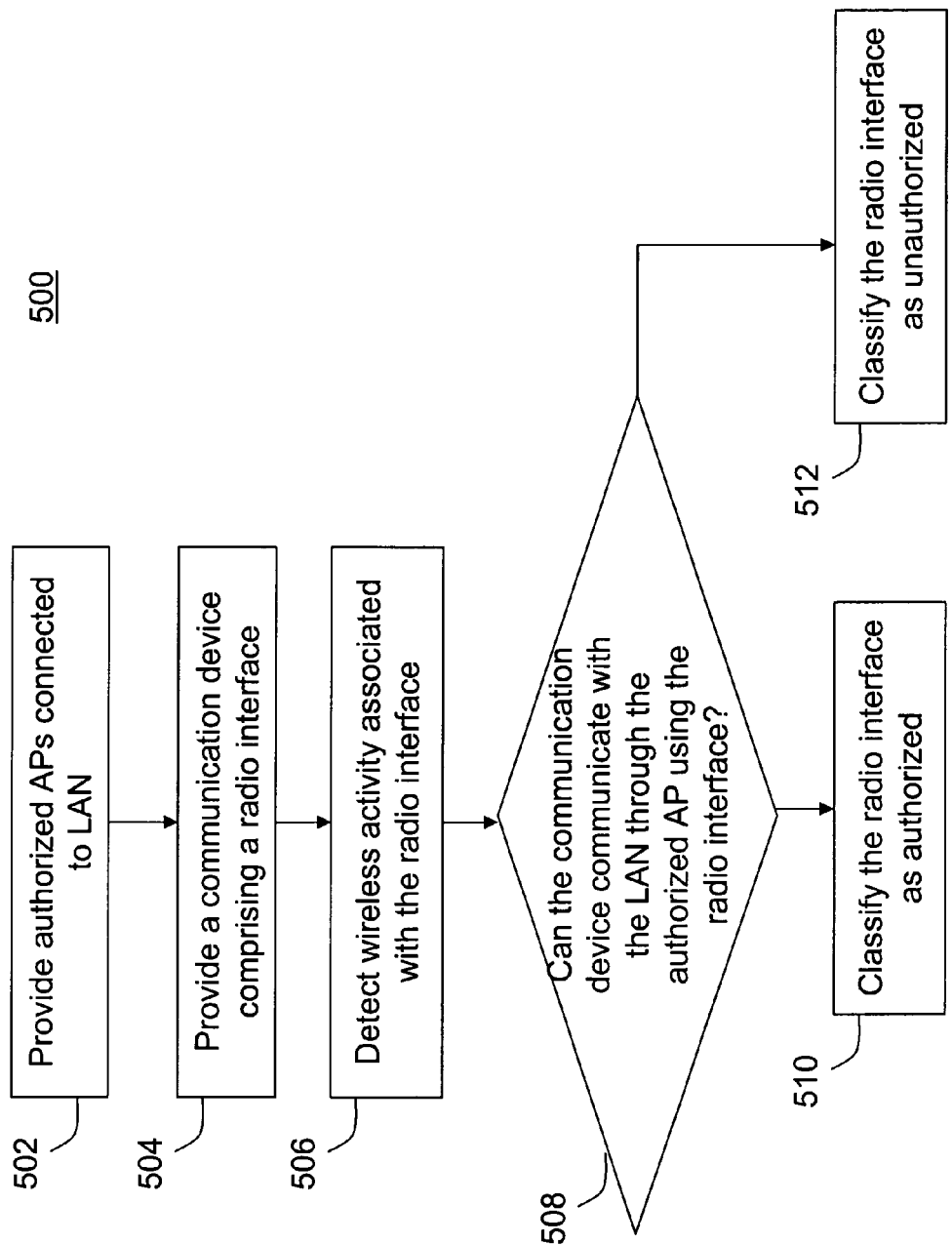
FIG. 5 is a simplified flowchart illustrating a method of classifying radio interfaces in a wireless network according to an embodiment of the present invention.

The technique of present invention provides a solution to this problem. In an embodiment a method is provided to recognize (e.g. automatically recognize) a MAC address of a radio interface (e.g. WiFi card) coupled to an authorized communication device (e.g. laptop) as an authorized radio interface. This advantageously facilitates consistent security policy enforcement even when user of the authorized communication device changes radio interfaces on the device. Notably the technique also eliminates cumbersome task of manually keeping inventory of radio interfaces that are coupled to the authorized communication devices. This method 500 which can be implemented using one or more sniffers 122 is illustrated in FIG. 5. This diagram is merely an example, which should not unduly limit the scope of the claims herein. One of ordinary skill in the art would recognize many variations, modifications, and alternatives.

As shown the method 500 comprises providing one or more authorized APs (e.g. APs 113A, 113B, 116 etc.) that are coupled to the LAN 101 (step 502). Preferably the APs include an authentication process. The authentication process can be used for verifying identity of a communication device before granting it wireless access to the LAN. As merely an example the authentication process can include a WEP shared key authentication process, an EAP (Extensible Authentication Protocol, also called 802.1x) authentication process such as PEAP (Protected EAP), TLS (Transport Layer Security), TTLS (Tunneled Transport Layer Security), GTC (Generic Token Cards), MSChapV2 (Microsoft Challenge Authentication Protocol), LEAP (Lightweight EAP), WPA (WiFi Protected Access) or any other authentication process. The authentication process can utilize credentials such as digital keys, passwords, digital certificates, smart cards, biometrics (e.g. fingerprints) etc. for identity verification. In some embodiments, the WEP shared key authentication process is not preferred due to its weakness. In some embodiments, the AP includes an open authentication process. An open authentication process may not include cryptographic authentication processes. Hence, the use of an open authentication process is not preferred.

The method includes providing a communication device (e.g. laptop, PDA etc.) and a radio interface (e.g. WiFi card) that is coupled to the communication device (step 504). The communication device can utilize the radio interface for wireless communications. Preferably the communication device is authorized to wirelessly access the LAN 101 through one or more of the authorized APs after successfully performing the authentication process. In an embodiment the authentication credentials (keys, passwords, certificates, biometric data etc.) are stored with the communication device (e.g. in the memory of a laptop or a PDA, in the smart card coupled to the laptop etc.).

The method includes detecting wireless activity associated with the radio interface (step 506) that is coupled to the communication device. The wireless activity can be detected using one or more sniffers. The wireless activity can include transmission of one or more wireless signals (e.g. 802.11 style frames) from the radio interface. The wireless activity can also include reception of one or more wireless signals (e.g. 802.11 style frames) at the radio interface. In an embodiment, information associated with the wireless activity is processed to identify a radio MAC address of the transmitting and/or the receiving radio interface.

In a particular embodiment, the one or more wireless signals includes a radio MAC address of the radio interface as a transmitter address or a receiver address. According to an embodiment of the present invention, a method is provided for processing information associated with the wireless signals to identify the radio MAC address. In a specific embodiment, the identified radio MAC address can be unknown, for example, when the radio interface is newly discovered within a geographic region monitored by the security monitoring system comprising one or more sniffers that are spatially disposed over the geographic region. In an alternative embodiment the radio MAC address can be called unknown because the wireless activity is detected when the radio interface becomes active after certain inactivity period.

The method also includes determining if the communication device is able to communicate with the LAN through one or more of the authorized APs utilizing the radio interface (step 508). In an embodiment this step includes determining if the MAC address of the radio interface (e.g. the radio MAC address of the radio interface) can be found in a set of MAC addresses detected in traffic over a wired portion of the LAN. In an embodiment, one or more sniffers detect the set of MAC addresses in the traffic over the wired portion of the LAN. For example, the sniffers can detect broadcast messages (such as DHCP Offer, DHCP Request, ARP Request) transmitted over the wired portion of the LAN. The sniffers can further process the messages to detect MAC addresses included in the messages and compile the set of MAC addresses.

In an embodiment, if the MAC address of the radio interface is found to be present in the set of MAC addresses detected over the wired portion of the LAN, the MAC address of the radio interface can be classified as authorized (step 510). The logic being that the authorized AP grants wired network access to the radio interface after performing an authentication process. Detection of the MAC address of the radio interface in the set of MAC addresses detected over the wired portion indicates that the radio interface can access the wired network. That is, the radio interface could complete the authentication process successfully. This in turn can indicate that the radio interface is coupled to an authorized communication device. In an embodiment, once the radio interface is classified as authorized, the security policy for the authorized stations (e.g. as shown by way of example in FIG. 3) can then be applied to the radio interface. In an embodiment, a list of radio MAC addresses of the radio interfaces that are classified as authorized is created. This list can be referred to as a list of authorized MAC addresses.

In an embodiment, if is detected that the radio interface communicates with the authorized AP over a wireless link, but the MAC address of the radio interface is not found to be present in the set of MAC addresses detected over the wired portion of the LAN (e.g. after waiting for certain period of time), the MAC address of the radio interface can be classified as unauthorized (step 512). The security policy for the unauthorized stations (e.g. as shown by way of example in FIG. 3) can then be applied to the radio interface.

Figure 6A:
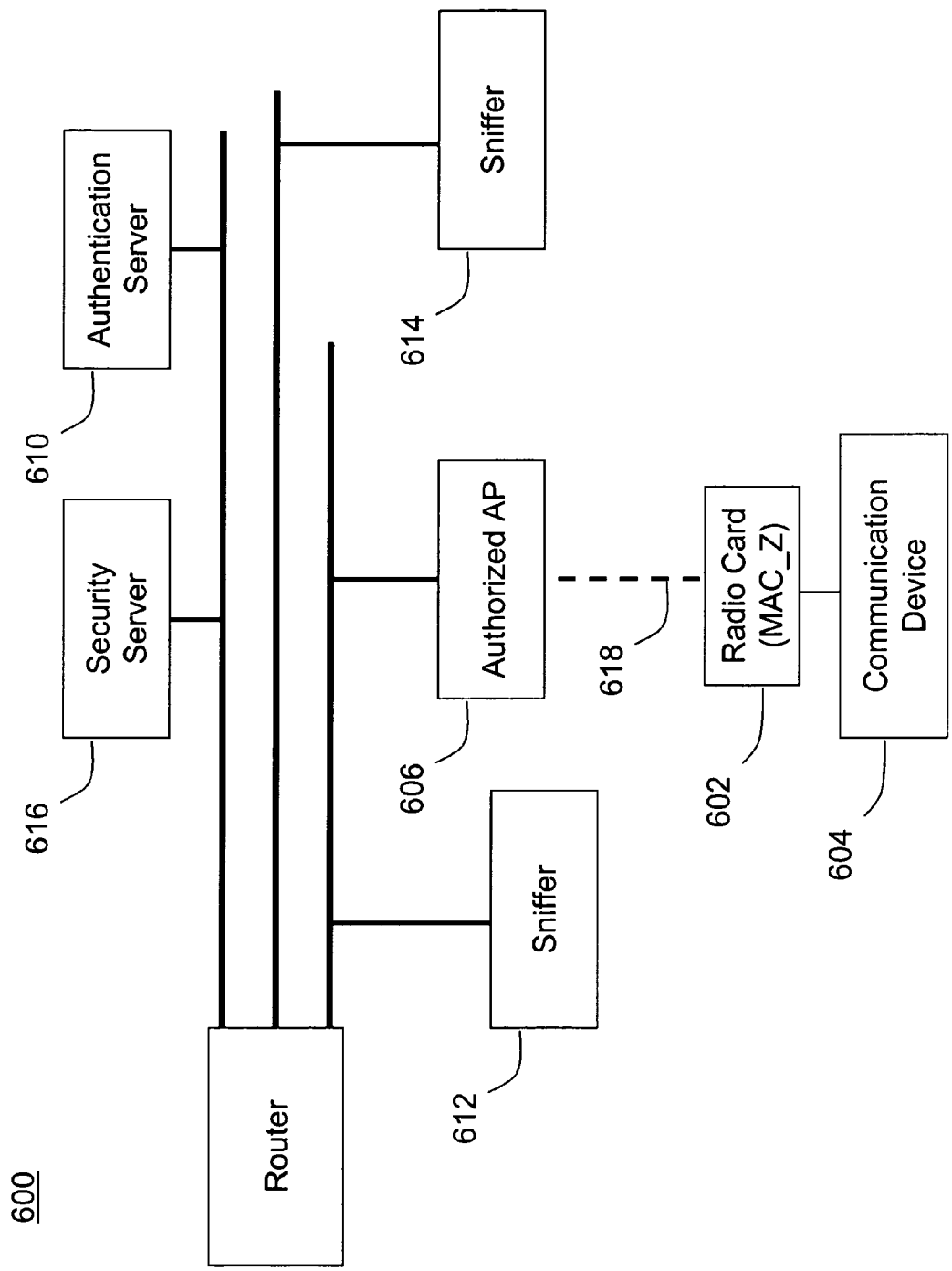
FIG. 6A is a simplified schematic diagram illustrating a network diagram according to an embodiment of the present invention.

FIG. 6A illustrates a simplified network diagram 600 that can facilitate the method 500 according to an embodiment of the present invention. This diagram is merely an example, which should not unduly limit the scope of the claims herein. One of ordinary skill in the art would recognize many variations, modifications, and alternatives. As shown, a radio interface (602) with MAC address MAC_Z is coupled to a communication device (604). An authorized AP (606) is coupled to a wired portion (608) of a LAN. In an embodiment, one or more subnetworks (e.g. IP subnetworks) or VLAN can be provided in the wired portion and the authorized AP is coupled to one or more of the subnetworks or the VLANs. The authorized AP (606) includes an authentication process. In an embodiment, an authentication server 610 (e.g. a RADIUS server, a network authentication server, a KERBEROS server etc.) is coupled to the wired portion. The authentication server can facilitate the authentication process.

FIG. 6A also shows sniffers 612 and 614 coupled to the wired portion. Any of the sniffers can be coupled to a single subnetwork or VLAN (e.g., using access port of a switch residing in the wired portion). Alternatively, any of the sniffers can be coupled to a plurality of subnetworks or VLANs (e.g. using a trunking port of a switch residing in the wired portion). A security server (616) can also be coupled to the wired portion.

As shown the communication device utilizes the radio interface to establish a wireless link (618) with the authorized access point. It then completes the authentication process. Subsequent to the authentication process, the communication device can access the wired portion utilizing the wireless link. These steps 652, 654 and 656 are illustrated by way of example in FIG. 6B. This diagram is merely an example, which should not unduly limit the scope of the claims herein. One of ordinary skill in the art would recognize many variations, modifications, and alternatives.

In an embodiment, the communication device performs DHCP handshake with the wired portion to obtain an IP address. The DHCP handshake can include a DHCP DISCOVER message sent from the MAC address MAC_Z of the radio interface to a broadcast address (e.g. hexadecimal FF:FF:FF:FF:FF:FF). This message can be detected by the sniffer (e.g. sniffer 612 which is coupled to the same subnetwork or the VLAN as the authorized AP). The sniffer can detect the MAC address MAC_Z in the message and report it to the server 616 as detected on the wired portion (step 658 in FIG. 6B). Alternatively, the MAC address MAC_Z of the radio interface can be detected from a DHCP REQUEST message, an ARP request message or any other message (e.g. broadcast or multicast message) that can be detected by the sniffer on the wired portion. In an embodiment the sniffer 610 has wireless NIC 204. In an alternative embodiment the sniffer 612 may not have wireless NIC 204. In yet an alternative embodiment the wireless NIC on the sniffer 612 can be turned off. In an embodiment the sniffer can monitor a single subnetwork or a VLAN. In an alternative embodiment the sniffer can monitor a plurality of subnetworks or VLANs. In an embodiment, the sniffer functionality (e.g. wireside functionality) can be provided as a software module on a switch or a router device.

Moreover a sniffer (e.g. sniffer 612, sniffer 614 or any other sniffer that can detect radio transmission from the radio interface) can detect the MAC address MAC_Z of the radio interface from traffic over the wireless link. In an embodiment, the MAC address MAC_Z of the radio interface can be detected from 802.11 style frames transmitted by or to the radio interface over the wireless link. The sniffer can report the MAC address MAC_Z to the server 616 as detected on the wireless link (step 660 of FIG. 6B).

Figure 6B:
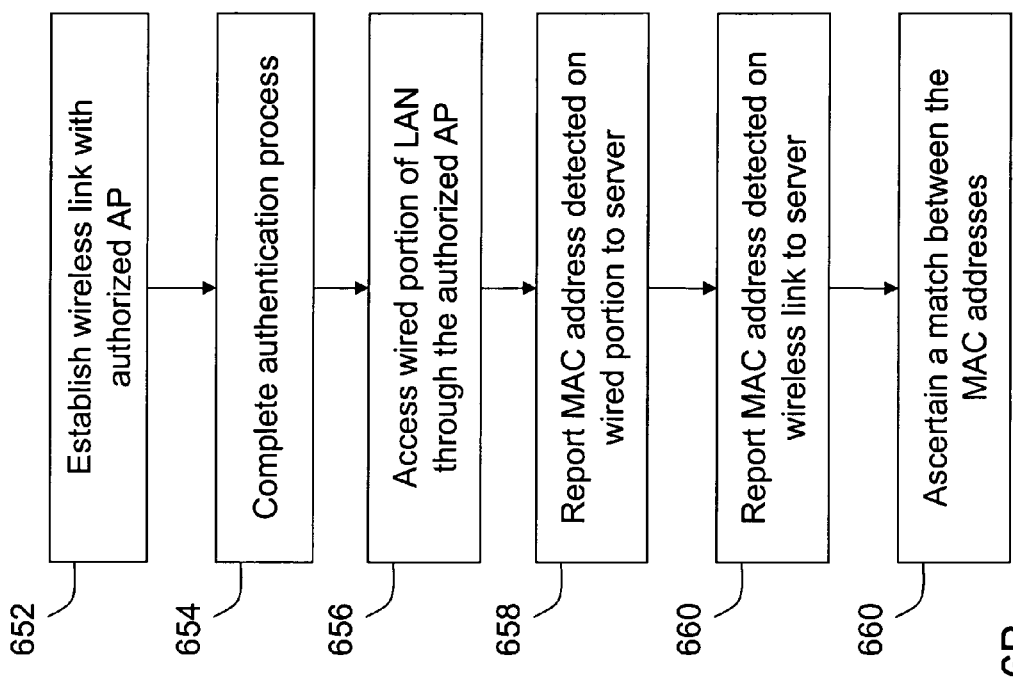
FIG. 6B is a simplified flowchart illustrating a method of classifying radio interfaced according to another embodiment of the present invention.

The server 616 can then ascertain a match between the MAC address reported as detected on the wired portion and the MAC address reported as detected on the wireless link (step 662 of FIG. 6B). It can then be inferred that the wireless communication device 604 can communicate with the wired portion 608 through the authorized AP 606.

Figure 7:
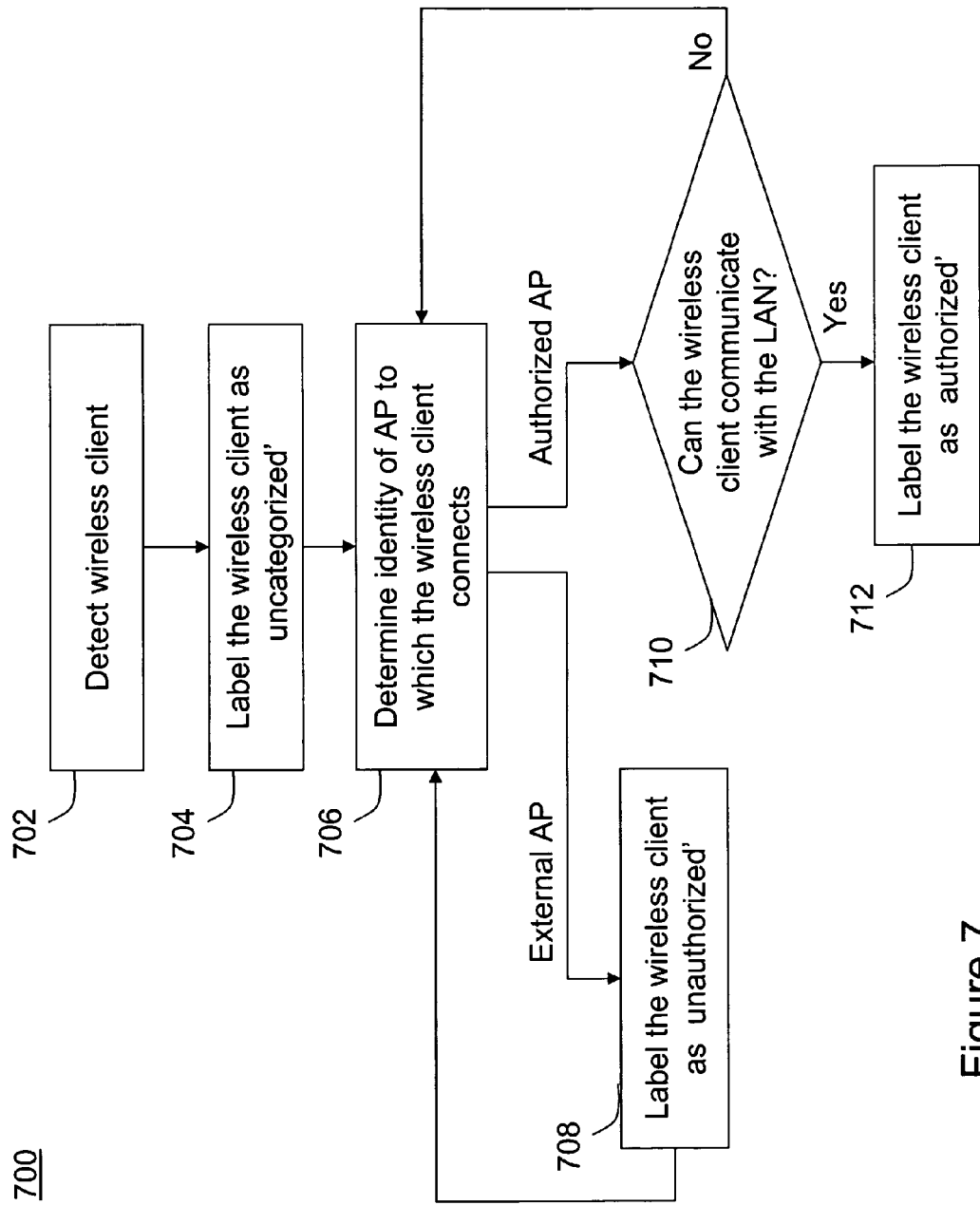
FIG. 7 is a simplified flowchart illustrating a method of classifying radio interfaces according to yet another embodiment of the present invention.

An exemplary flowchart 700 for classification (e.g. automatic classification) of radio interfaces (also called as wireless clients) according to an embodiment of the present invention is illustrated in FIG. 7. This flowchart can be implemented using the foregoing techniques. This diagram is merely an example, which should not unduly limit the scope of the claims herein. One of ordinary skill in the art would recognize many variations, modifications, and alternatives.

As shown a wireless client is detected (702). In an embodiment the detecting includes inferring a MAC address (e.g. wireless MAC address) of the wireless client by capturing (e.g. sniffing) and processing 802.11 style frames transmitted or received by the wireless client on the wireless link. The wireless client can be labeled as "uncategorized" (704).

In an embodiment the wireless client can connect to an AP. Identity of the AP to which the wireless client connects can be determined (706). In an embodiment, if it is determined that the wireless client connects to an external AP, the client is labeled as "unauthorized" (708). In an embodiment, if it is determined that the wireless client connects to an authorized AP, the technique of present invention can detect if the client can communicate with the LAN through the authorized AP (710). If so, the client can be labeled as "authorized" (712). Notably detecting if the client can communicate with the LAN through the authorized AP provides protection against wireless clients which can fake connection with the authorized AP (e.g. by sending packets over the wireless medium which include MAC address of the authorized AP).

The various embodiments may be implemented as part of a computer system. The computer system may include a computer, an input device, a display unit, and an interface, for example, for accessing the Internet. The computer may include a microprocessor. The microprocessor may be connected to a data bus. The computer may also include a memory. The memory may include Random Access Memory (RAM) and Read Only Memory (ROM). The computer system may further include a storage device, which may be a hard disk drive or a removable storage drive such as a floppy disk drive, optical disk drive, jump drive and the like. The storage device can also be other similar means for loading computer programs or other instructions into the computer system.

As used herein, the term "computer" may include any processor-based or microprocessor-based system including systems using microcontrollers, digital signal processors (DSP), reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer". The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A wireless security method comprising:
installing a security system within a selected geographic region, the security system comprising at least one sniffer device disposed within the selected geographic region, the selected geographic region comprising an authorized local area network;
detecting wireless transmissions within the selected geographic region using the at least one sniffer device;
determining identity of a radio interface present in the selected geographic region from the detected wireless transmissions, wherein information regarding coupling of the radio interface with an authorized communication device is not accessible to the security system;
identifying from the detected wireless transmissions a wireless connection between the radio interface and an authorized wireless access point, the authorized wireless access point being adapted to act as traffic transfer point between a wired portion and a wireless portion of the authorized local area network;
detecting the identity of the radio interface in traffic over the wired portion of the authorized local area network;
classifying the radio interface as being coupled with the authorized communication device based upon the identity of the radio interface being present both in the wireless transmissions and in the traffic over the wired portion;
providing for allowing the radio interface to communicate with the authorized wireless access point and for disallowing the radio interface from communicating with an external wireless access point, wherein the external wireless access point acts as traffic transfer point between a wired portion and a wireless portion of a neighborhood local area network, the neighborhood local area network being distinct from the authorized local area network.

2. The method of claim 1 wherein the radio interface comprises a wireless network interface card.

3. The method of claim 1 wherein the authorized communication device comprises at least a laptop computer or at least a PDA.

4. The method of claim 1 wherein the identity of the radio interface is a radio MAC address.

5. The method of claim 4 wherein the wireless transmissions comprise at least one IEEE 802.11 type frame and the radio MAC address is included in the IEEE 802.11 type frame.

6. The method of claim 1 wherein classifying the radio interface is free from manual interaction.

7. The method of claim 1 wherein the information regarding the coupling of the radio interface with the authorized communication device being not accessible to the security system is characterized by the identity of the radio interface being absent from a list of authorized MAC addresses which is accessible to the security system.

8. The method of claim 1 wherein the authorized wireless access point is adapted to perform an authentication process before allowing the radio interface to send data to the wired portion of the authorized local area network through the authorized wireless access point.

9. The method of claim 8 wherein the authentication process comprises verifying identity of the authorized communication device.

10. The method of claim 1 further comprising establishing that the authorized wireless access point does not use an open authentication process prior to the classifying.

11. The method of claim 1 further comprising establishing that the authorized wireless access point does not use a WEP shared key authentication process prior to the classifying.

12. The method of claim 1 further comprising establishing that the authorized wireless access point uses an 802.1x (EAP) authentication process prior to the classifying.

13. A wireless security method comprising:
installing a security system within a selected geographic region, the security system comprising at least one sniffer device disposed within the selected geographic region, the selected geographic region comprising an authorized local area network;
detecting wireless transmissions within the selected geographic region using the at least one sniffer device;
determining identity of a radio interface present in the selected geographic region from the detected wireless transmissions;
identifying from the detected wireless transmissions a wireless connection between the radio interface and an authorized wireless access point, the authorized wireless access point being adapted to act as traffic transfer point between a wired portion and a wireless portion of the authorized local area network;
establishing that the identity of the radio interface in absent from traffic over the wired portion of the authorized local area network;
classifying the radio interface as being not coupled with an authorized communication device based upon the identity of the radio interface being absent from the traffic over the wired portion;
providing for disallowing the radio interface from communicating with the authorized wireless access point and for allowing the radio interface to communicate with an external wireless access point, wherein the external wireless access point acts as traffic transfer point between a wired portion and a wireless portion of a neighborhood local area network, the neighborhood local area network being distinct from the authorized local area network.

14. The method of claim 13 wherein the radio interface comprises a wireless network interface card.

15. The method of claim 13 wherein the authorized communication device comprises at least a laptop computer or at least a PDA.

16. The method of claim 13 wherein the identity of the radio interface is a radio MAC address.

17. The method of claim 16 wherein the wireless transmissions comprise at least one IEEE 802.11 type frame and the radio MAC address is included in the IEEE 802.11 type frame.

18. The method of claim 13 wherein classifying the radio interface is free from manual interaction.

19. The method of claim 13 wherein the authorized wireless access point is adapted to perform an authentication process before allowing the radio interface to send data to the wired portion through the authorized wireless access point.

20. The method of claim 13 wherein the authentication process comprises verifying identity of a communication device to which the radio interface is coupled.

21. A wireless security system comprising:
- at least one first interface for monitoring radio transmissions;
- at least one second interface for monitoring traffic in a wired network; and
- at least one computer readable medium coupled to the first interface and the second interface, the computer readable medium storing instructions executable by at least one processor to perform steps of:
  - detecting wireless transmissions using the first interface;
  - determining identity of a client radio interface present in the detected wireless transmissions, wherein information regarding coupling of the client radio interface with an authorized communication device is not accessible to the at least one processor;
  - identifying from the detected wireless transmissions a wireless connection between the client radio interface and an authorized wireless access point, the authorized wireless access point being adapted to act as traffic transfer point between a wired portion and a wireless portion of an authorized local area network;
  - detecting the identity of the client radio interface in traffic over the wired portion of the authorized local area network using the second interface;
  - classifying the client radio interface as being coupled with the authorized communication device based upon the identity of the client radio interface being present both in the wireless transmissions and in the traffic over the wired portion; and
  - providing for allowing the client radio interface to communicate with the authorized wireless access point and for disallowing the radio interface from communicating with an external wireless access point, wherein the external wireless access point acts as traffic transfer point between a wired portion and a wireless portion of a neighborhood local area network, the neighborhood local area network being distinct from the authorized local area network.

22. A wireless security system comprising:
- at least one first interface for monitoring radio transmissions;
- at least one second interface for monitoring traffic in a wired network; and
- at least one computer readable medium coupled to the first interface and the second interface, the computer readable medium storing instructions executable by at least one processor to perform steps of:
  - detecting wireless transmissions using the first interface;
  - determining identity of a client radio interface present in the detected wireless transmissions;
  - identifying from the detected wireless transmissions a wireless connection between the client radio interface and an authorized wireless access point, the authorized wireless access point being adapted to act as traffic transfer point between a wired portion and a wireless portion of an authorized local area network;
  - establishing using the second interface that the identity of the client radio interface is absent from traffic over the wired portion of the authorized local area network;
  - classifying the client radio interface as not being coupled with an authorized communication device based upon the identity of the client radio interface being absent from the traffic over the wired portion; and
  - providing for disallowing the client radio interface from communicating with the authorized wireless access point and for allowing the radio interface to communicate with an external wireless access point, wherein the external wireless access point acts as traffic transfer point between a wired portion and a wireless portion of a neighborhood local area network, the neighborhood local area network being distinct from the authorized local area network.

* * * * *